United States Patent
Matsuoka

(10) Patent No.: US 12,333,267 B2
(45) Date of Patent: Jun. 17, 2025

(54) TEXT GENERATION MODEL GENERATING DEVICE, TEXT GENERATION MODEL, AND TEXT GENERATING DEVICE

(71) Applicant: NTT DOCOMO, INC., Chiyoda-ku (JP)

(72) Inventor: Hosei Matsuoka, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 147 days.

(21) Appl. No.: 18/252,140

(22) PCT Filed: Oct. 20, 2021

(86) PCT No.: PCT/JP2021/038829
§ 371 (c)(1),
(2) Date: May 8, 2023

(87) PCT Pub. No.: WO2022/102364
PCT Pub. Date: May 19, 2022

(65) Prior Publication Data
US 2024/0303445 A1  Sep. 12, 2024

(30) Foreign Application Priority Data

Nov. 13, 2020  (JP) ................................ 2020-189333

(51) Int. Cl.
*G06F 40/58* (2020.01)
(52) U.S. Cl.
CPC .................................... *G06F 40/58* (2020.01)
(58) Field of Classification Search
None
See application file for complete search history.

(56) References Cited

U.S. PATENT DOCUMENTS

| | | | |
|---|---|---|---|
| 2019/0080688 A1* | 3/2019 | Itsui | G10L 15/197 |
| 2019/0278812 A1* | 9/2019 | Otsuka | G06F 16/00 |
| 2020/0226328 A1* | 7/2020 | Tu | G06F 40/44 |

FOREIGN PATENT DOCUMENTS

JP  2020-135457 A  8/2020

OTHER PUBLICATIONS

International Search Report mailed on Jan. 11, 2022 in PCT/JP2021/038829 filed on Oct. 20, 2021.

(Continued)

*Primary Examiner* — Antim G Shah
(74) *Attorney, Agent, or Firm* — Oblon, McClelland, Maier & Neustadt, L.L.P.

(57) ABSTRACT

A text generation model generating device is a device generating a text generation model generating output text of a second language in accordance with input of input text of a first language and includes: an encoder input unit configured to input first data composing input text to an encoder; a decoder input unit configured to input a context used for designating conditions for output text, a start symbol, and second data composing output text to a decoder; an update unit configured to update weighting coefficients configuring the encoder and the decoder on the basis of an error for each word between an array of words output from the decoder in a later stage after input of the start symbol and an array of words included in the second data; and a model output unit configured to output the text generation model in which the weighting coefficients are updated.

13 Claims, 14 Drawing Sheets

(56) References Cited

OTHER PUBLICATIONS

International Preliminary Report on Patentability and Written Opinion issued May 25, 2023, in PCT/JP2021/038829, 5 pages.

* cited by examiner

TEXT GENERATION MODEL GENERATING DEVICE, TEXT GENERATION MODEL, AND TEXT GENERATING DEVICE

TECHNICAL FIELD

The present invention relates to a text generation model generating device, a text generation model, and a text generating device.

BACKGROUND ART

A technology in which a model generating output text formed from a translation, for example, in a second language in accordance with input text in a first language is generated through machine learning, and a translation engine, a scoring engine, and the like are configured using the generated model is known. For example, in Patent Literature 1, a technology for generating text corresponding to input text using a machine learning model is disclosed.

CITATION LIST

Patent Literature

[Patent Literature 1]
[Non-Patent Literature 1] Japanese Unexamined Patent Publication No. 2020-135457

SUMMARY OF INVENTION

Technical Problem

In a general translation engine, a scoring engine, and the like configured using a model learned on the basis of input text, and a translation thereof, translation text corresponding to semantic content thereof is output, and thus, for example, translation text according to conditions of a specific expression being used, a current context, and the like cannot be output.

Thus, the present invention is in consideration of the problems described above, and an object thereof is to obtain output text of a second language according to a specific condition in accordance with input text of a first language.

Solution to Problem

In order to solve the problems described above, a text generation model generating device according to one embodiment of the present invention is a text generation model generating device generating a text generation model generating output text of a second language different from a first language in accordance with input of input text of the first language by machine learning, wherein the text generation model is an encoder decoder model that includes a neural network and is configured using an encoder and a decoder, wherein learning data used for the machine learning of the text generation model includes first data, a context, and second data, the first data including an array of a plurality of words composing the input text, the second data including an array of a plurality of words composing the output text corresponding to the input text, and the context including one or more words of the second language relating to the second data, the text generation model generating device including: an encoder input unit configured to input the first data to the encoder in accordance with an arrangement order of words; a decoder input unit configured to input the context, a start symbol that is a predetermined symbol indicating start of output of the output text, and words composing the second data to the decoder in accordance with an arrangement order; an update unit configured to update weighting coefficients configuring the encoder and the decoder on the basis of an error for each word between an array of words output from the decoder in a later stage after input of the start symbol and an array of words included in the second data; and a model output unit configured to output the text generation model in which the weighting coefficients are updated by the update unit.

According to the embodiment described above, the text generation model is configured using an encoder decoder model including an encoder and a decoder. In learning of the text generation model in which first data corresponding to input text is input to the encoder and second data corresponding to output text is input to the decoder, a context including words relating to the second data, that is, the output text is input to the decoder together with the second data. Thus, the text generation model learns a relationship between the context and the second data, and thus the text generation model outputting output text according to conditions of the output text set in the context can be acquired.

Advantageous Effects of Invention

Output text of a second language according to a specific condition can be obtained in accordance with input text of a first language.

DESCRIPTION OF EMBODIMENTS

A text generation model generating device, a text generating device, and a text generation model according to an embodiment of the present invention will be described with reference to the drawings. In addition, if possible, the same reference signs will be assigned to the same parts, and duplicate description will be omitted.

A text generation model according to this embodiment is a model that is constructed through machine learning for generating output text of a second language different from a first language in accordance with an input of input text of the first language by causing a computer to function. The text generation model includes a neural network and is configured using an encoder/decoder model including an encoder and a decoder.

A text generation model generating device according to this embodiment is a device that generates a text generation model by machine learning. A text generating device is a device that generates output text of a second language in accordance with an input of input text of a first language using a text generation model constructed by machine learning.

Examples in which problems solved by the text generation model generating device, the text generation model, and the text generating device according to this embodiment occur will be described.

In a situation of school education or the like, there are cases in which English composition is performed using a specific expression (for example, a gerund, an infinitive, or the like). For example, in a case in which a "so that" construction is to be learned, it is required to translate a Japanese sentence of "Watashitachiha gaikokujinto hanaseruyoninarutameni eigowo benkyosuru" into an English sentence of "We study English so that we can talk to foreigners." However, in general translation and a general scoring engine of a conventional case, an English translation of "We study English to become able to speak with foreigners," may be output or highly evaluated.

In addition, a translation of an answer sentence of "Hai, Arimasu" for a question sentence of "Anataha rekishini kyomiga arimasuka?" is "Yes, I am." in a case in which an English question sentence is "Are you interested in history?" and is "Yes, I do," in a case in which an English question sentence is "Do you have an interest in history?" and thus, in a conventional translation engine in which a question sentence is not taken into account, a translation of an answer sentence is not uniquely determined.

In this embodiment, together with enabling generation of output text according to a desired condition, an appropriate evaluation of generated text based on output text according to the desired condition can be performed.

Figure 1:
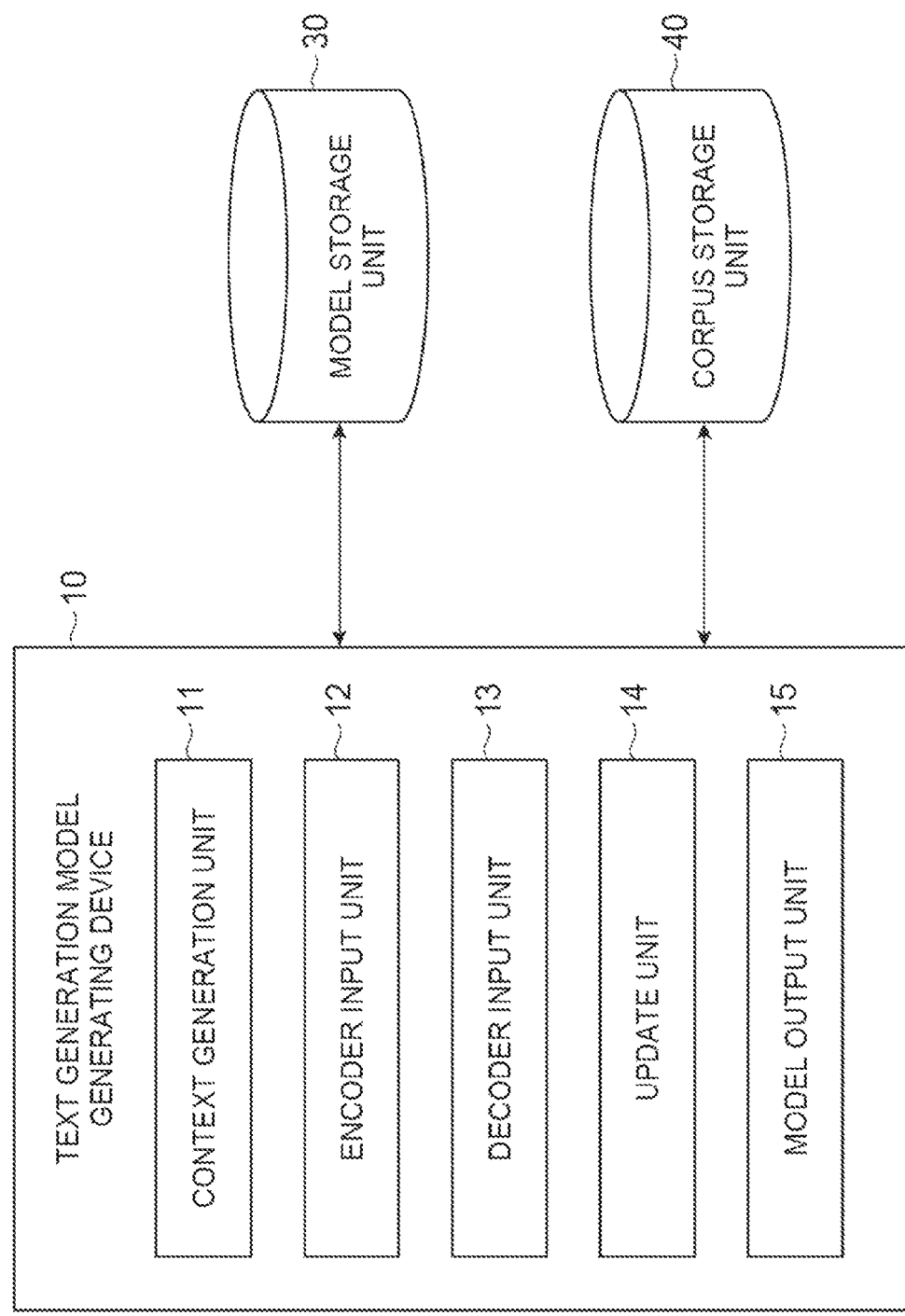
FIG. 1 is a block diagram illustrating a functional configuration of a text generation model generating device according to this embodiment.

FIG. 1 is a block diagram illustrating a functional configuration of a text generation model generating device according to this embodiment. The text generation model generating device 10 is a device that generates a text generation model generating output text of a second language different from a first language in accordance with an input of input text of the first language by machine learning. As illustrated in FIG. 1, the text generation model generating device 10 functionally includes a context generation unit 11, an encoder input unit 12, a decoder input unit 13, an update unit 14, and a model output unit 15. Such functional units 11 to 15 may be configured in one device or may be configured to be distributed among a plurality of devices.

In addition, the text generation model generating device 10 is configured to be accessible to storage means such as a model storage unit 30 and a corpus storage unit 40. The model storage unit 30 and the corpus storage unit 40 may be configured inside the text generation model generating device 10 and, as illustrated in FIG. 1, may be configured as another device that can be accessed from the text generation model generating device outside the text generation model generating device 10.

The model storage unit 30 is a storage means storing a text generation model that has completed learning, is in a learning process, and the like and can be configured using a storage, a memory, and the like.

The corpus storage unit 40 is a storage means that stores learning data used for machine learning of a text generation model, a corpus used for generating learning data, and the like and may be configured using a storage, a memory, and the like.

Figure 2:
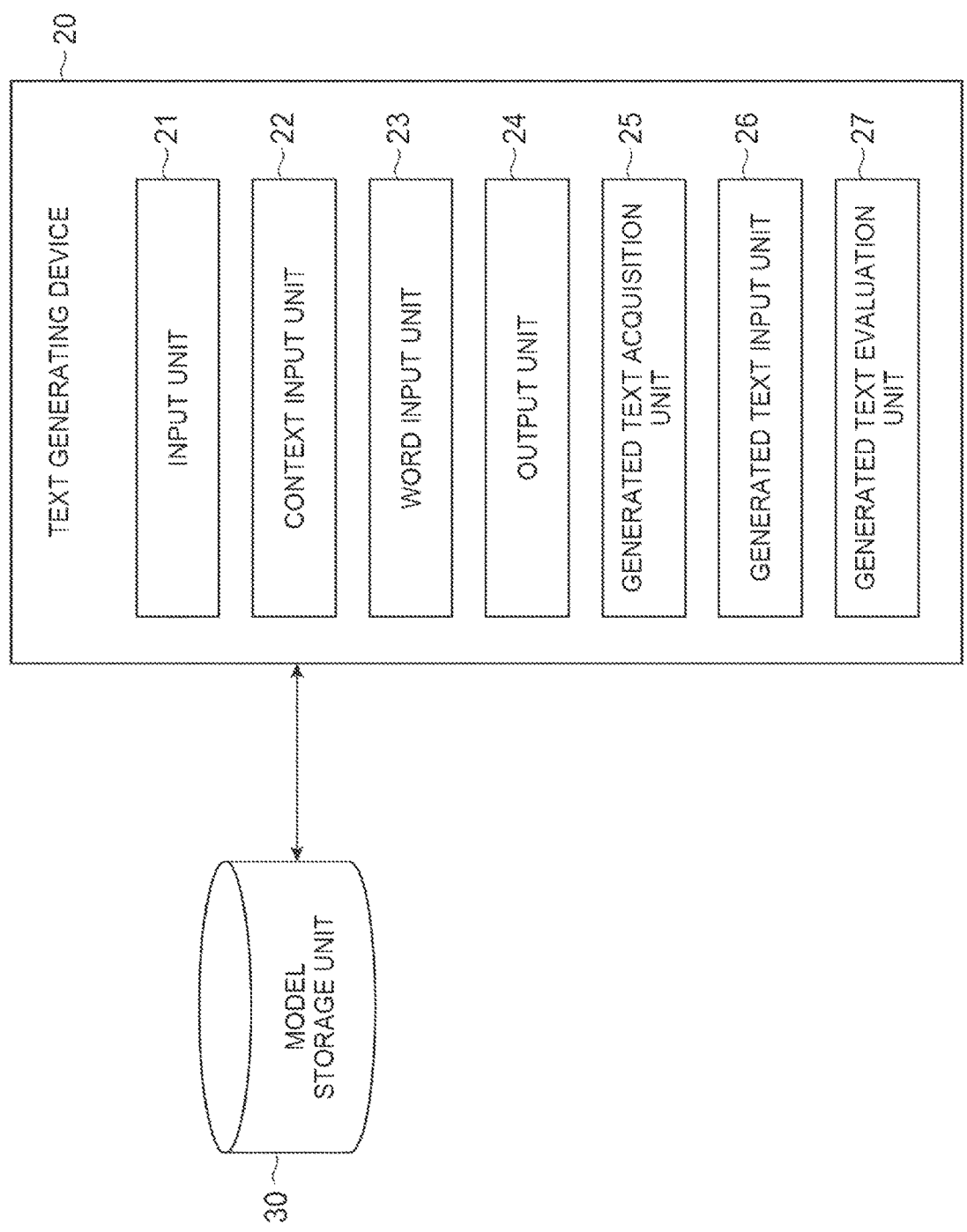
FIG. 2 is a block diagram illustrating a functional configuration of a text generating device according to this embodiment.

FIG. 2 is a diagram illustrating a functional configuration of a text generating device according to this embodiment. The text generating device 20 is a device that generates output text of a second language different from a first language in accordance with an input of input text of the first language using a text generation model constructed by machine learning. As illustrated in FIG. 2, the text generating device 20 functionally includes an input unit 21, a context input unit 22, a word input unit 23, and an output unit 24. The text generating device 20 may further include a generated text acquisition unit 25, a generated text input unit 26, and a generated text evaluation unit 27. Such functional units 21 to 27 may be configured in one device or may be configured to be distributed among a plurality of devices.

In addition, the text generating device 20 is configured to be accessible to the model storage unit 30 that stores a learned text generation model. The model storage unit 30 may be configured inside the text generating device 20 or may be configured in another external device.

In addition, in this embodiment, although an example in which the text generation model generating device 10 and the text generating device 20 are configured in different devices (computers) is illustrated, they may be integrally configured.

The block diagrams illustrated in FIGS. 1 and 2 illustrate blocks in units of functions. Such functional blocks (component units) are realized by an arbitrary combination of at least one of hardware and software. In addition, a method for realizing each functional block is not particularly limited. In other words, each functional block may be realized by using one device that is combined physically or logically or using a plurality of devices by directly or indirectly (for example, using a wire or wirelessly) connecting two or more devices separated physically or logically. A functional block may be realized by one device or a plurality of devices described above and software in combination.

As functions, there are deciding, determining, judging, computing, calculating, processing, deriving, inspecting, searching, checking, receiving, transmitting, outputting, accessing, solving, selecting, choosing, establishing, comparing, assuming, expecting, regarding, broadcasting, notifying, communicating, forwarding, configuring, reconfiguring, allocating, mapping, assigning, and the like, and the functions are not limited thereto. For example, a functional block (constituent unit) performing a transmission function is referred to as a transmitting unit or a transmitter. As described above, a method for realizing all the functions is not particularly limited.

Figure 3:
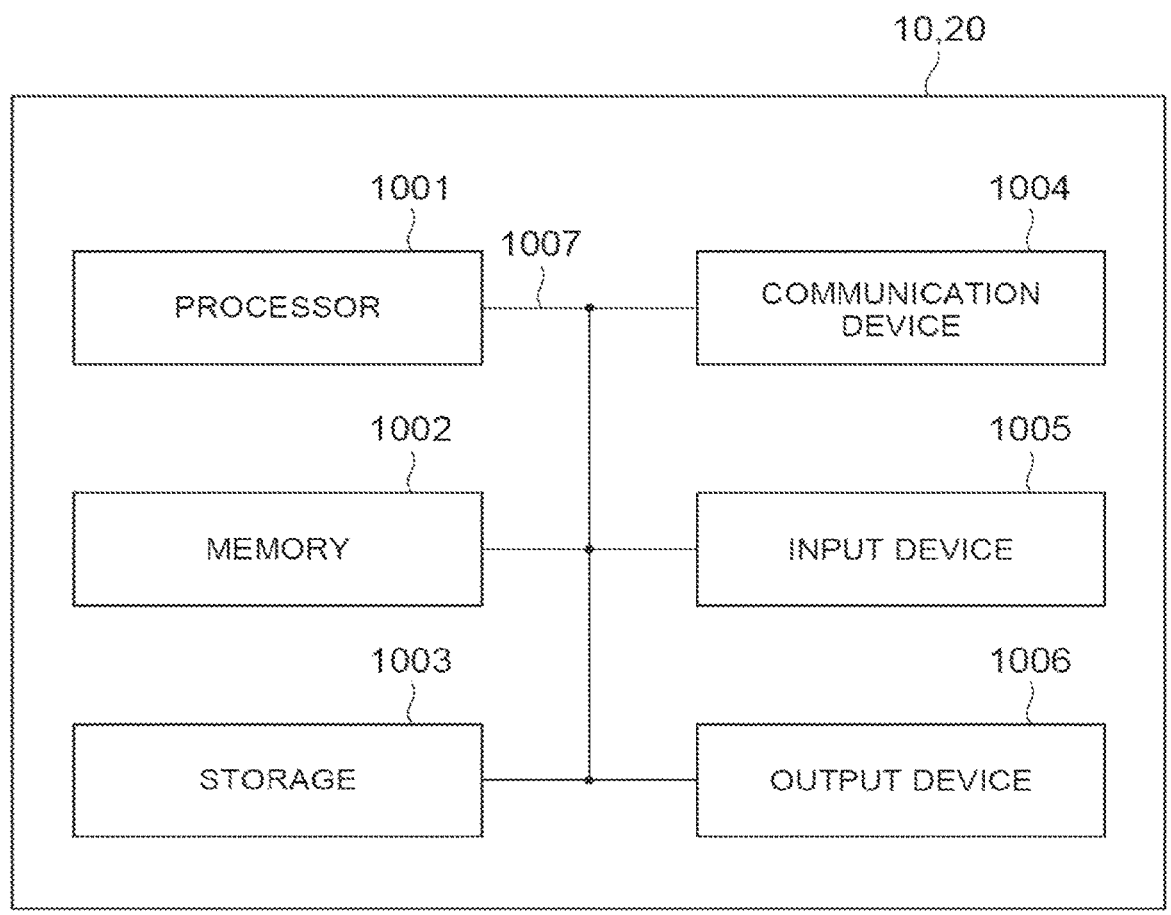
FIG. 3 is a hardware block diagram of a text generation model generating device and a text generating device.

For example, the text generation model generating device 10 and the text generating device 20 according to one embodiment of the present invention may function as computers. FIG. 3 is a diagram illustrating an example of a hardware configuration of the text generation model generating device 10 and the text generating device 20 according to this embodiment. Each of the text generation model generating device 10 and the text generating device 20 may be physically configured as a computer device including a processor 1001, a memory 1002, a storage 1003, a communication device 1004, an input device 1005, an output device 1006, a bus 1007, and the like.

In addition, in the following description, the term "device" may be replaced with "circuit," "device," "unit," or the like. The hardware configuration of the text generation model generating device 10 and the text generating device 20 may be configured to include one or a plurality of devices illustrated in the drawing and may be configured without including some of these devices.

Each function of the text generation model generating device 10 and the text generating device 20 may be realized when the processor 1001 performs an arithmetic operation by causing predetermined software (a program) to be read onto hardware such as the processor 1001, the memory 1002, and the like, controls communication using the communication device 1004, and controls data reading and/or data writing for the memory 1002 and the storage 1003.

The processor 1001, for example, controls the entire computer by operating an operating system. The processor 1001 may be configured by a central processing unit (CPU) including an interface with peripheral devices, a control device, an arithmetic operation device, a register, and the like. For example, each of the functional units 11 to 15, 21 to 27, and the like illustrated in FIGS. 1 and 2 may be realized by the processor 1001.

In addition, the processor 1001 reads a program (program code), a software module, data, and the like from the storage 1003 and/or the communication device 1004 into the memory 1002 and executes various processes in accordance with these. As the program, a program causing a computer to execute at least some of the operations described in the embodiment described above is used. For example, each of the functional units 11 to 15 and 21 to 27 of the text generation model generating device 10 and the text generating device 20 may be realized by a control program that is stored in the memory 1002 and operated by the processor 1001. Although the various processes described above have been described as being executed by one processor 1001, the processes may be executed simultaneously or sequentially by two or more processors 1001. The processor 1001 may be realized using one or more chips. In addition, the program may be transmitted from a network through a telecommunication line.

The memory 1002 is a computer-readable recording medium and, for example, may be configured by at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), or the like. The memory 1002 can store a program (a program code), a software module, and the like executable for performing a text generation model generating method and a text generating method according to one embodiment of the present invention.

The storage 1003 is a computer-readable recording medium and, for example, may be configured by at least one of an optical disc such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, a magnetic strip, and the like.

The storage 1003 may be referred to as an auxiliary storage device. The storage medium described above, for example, may be a database including the memory 1002 and/or the storage 1003, a server, or any other appropriate medium.

The communication device 1004 is hardware (a transmission/reception device) for performing inter-computer communication through at least one of a wired network and a wireless network and, for example, may also be called a network device, a network controller, a network card, a communication module, or the like.

The input device 1005 is an input device (for example, a keyboard, a mouse, a microphone, a switch, buttons, a sensor, or the like) that accepts an input from the outside. The output device 1006 is an output device (for example, a display, a speaker, an LED lamp, or the like) that performs output to the outside. In addition, the input device 1005 and the output device 1006 may have an integrated configuration (for example, a touch panel).

In addition, devices such as the processor 1001, the memory 1002, and the like are connected using a bus 1007 for communication of information. The bus 1007 may be configured as a single bus or different buses between devices.

In addition, the text generation model generating device 10 and the text generating device 20 may be configured to include hardware such as a microprocessor, a digital signal processor (DSP), an application specific integrated circuit (ASIC), a programmable logic device (PLD), a field programmable gate array (FPGA), or the like, and a part or the whole of each functional block may be realized by the hardware. For example, the processor 1001 may be mounted using at least one of such hardware components.

Figure 4:
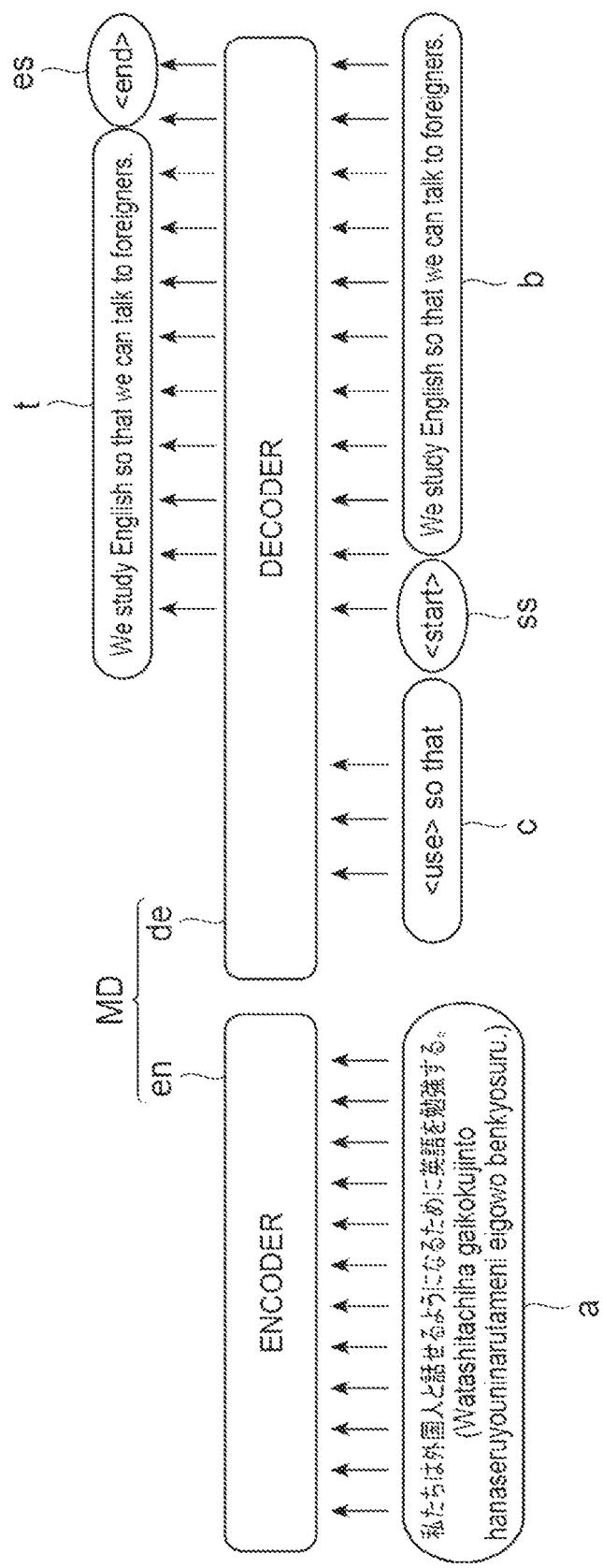
FIG. 4 is a diagram illustrating a configuration of a text generation model.

FIG. 4 is a diagram illustrating a configuration of a text generation model according to this embodiment. As illustrated in FIG. 4, the text generation model MD is an encoder/decoder model that includes a neural network and is configured using an encoder en and a decoder de. Although the neural network configuring the encoder/decoder model is not particularly limited, in an example it is a recurrent neural network (RNN). In addition, the text generation model MD may be a neural network called a transformer.

Learning data used for machine learning of the text generation model MD according to this embodiment includes first data a, second data b, and a context c. The first data a includes an array of a plurality of words configuring input text of a first language. The second data b includes an array of a plurality of words configuring output text of a second language corresponding to the input text. For example, the output text is a translation of the input text. The context c includes one or more words of the second language relating to the second data b.

The first data a configuring the input text of the first language is input to the encoder en. More specifically, the first data a is divided into words, for example, using a morpheme analysis or the like. Each divided word is converted into (embedded in) a corresponding word vector and is input to the encoder en in accordance with an arrangement order in the first data a (the input text). The encoder en outputs a vector (for example, an output of an intermediate layer, a source target attention, or the like) representing a calculation result based on the first data a to the decoder de.

In a general encoder/decoder model, a decoder sequentially outputs a series of words on the basis of a vector supplied from the encoder and an input of a predetermined start symbol (vector) indicating the start of an output. On the other hand, a context c in a prior stage of the input of a start symbol ss is input to the decoder de of the text generation model MD according to this embodiment. The decoder de outputs a series of words (vectors) of output text t on the basis of an output from the encoder en and inputs of the context c and the start symbol ss. When a termination symbol es indicating the end of the output text is supplied from the decoder, the output text t is configured using a series of words output until then. In a phase of learning, second data b corresponding to the output text (a translation of input text according to a second language) corresponding to first data a (the input text) is input to the decoder de in accordance with an arrangement order for each word in a later stage of an input of a start symbol ss.

The context c includes one or more words of the second language relating to second data b. Although generation and the like of the context c will be described in detail below, the context c may be configured to include one or more words configuring a part of the second data b. In addition, the context c may be a question sentence of the second language having output text configured using words included in the second data b as an answer sentence.

Functional units of the text generation model generating device 10 will be described with reference to FIG. 1 again. The context generation unit 11 generates a context on the basis of a corpus. Generation of a context and learning data including a context will be described with reference to FIGS. 5 to 7.

Figure 5:
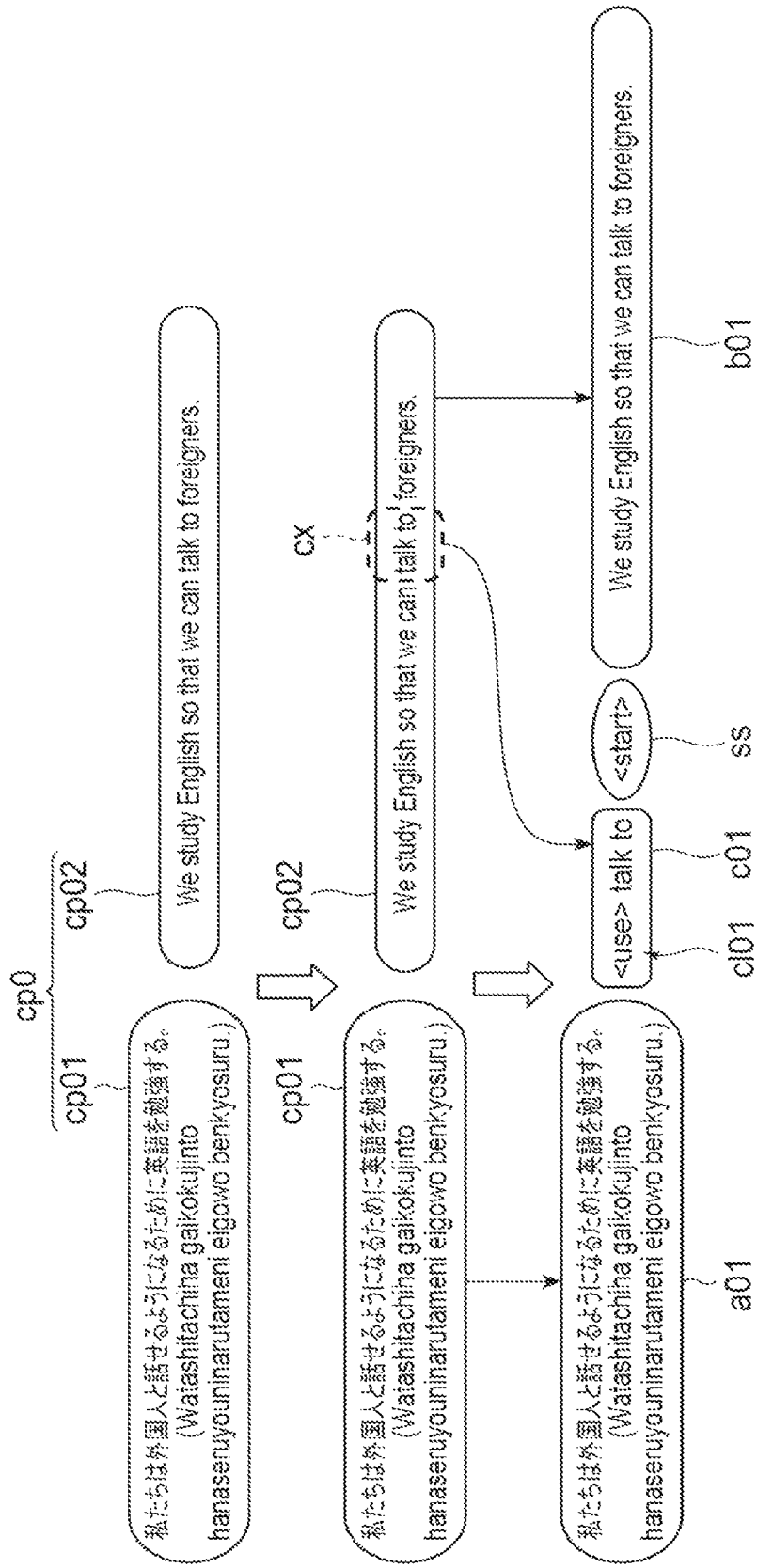
FIG. 5 is a diagram illustrating an example of generation of first data and second data and a context based on a corpus.

FIG. 5 is a diagram illustrating an example of generation of first data and second data and a context based on a corpus. The context generation unit 11, for example, acquires a corpus cp0 from the corpus storage unit 40. The corpus cp0 is formed from a first text cp01 composed using a first language and a second text cp02 composed using a second language. In the example illustrated in FIG. 5, the first text cp01 is a Japanese text, and the second text cp02 is a text of a translation of the first text cp01 into English.

The context generation unit 11 extracts a word cx composing a part of the second text cp02 as a context. The context generation unit 11 may randomly extract a word cx from a plurality of words composing the second text cp02. In addition, the context generation unit 11 may extract a word cx on the basis of a designation input representing a characteristic part of the second text cp02.

The context generation unit 11 generates a context c01 on the basis of the extracted word cx. In addition, the context generation unit 11 generates first data a01 and second data b01 of learning data respectively on the basis of the first text cp01 and the second text cp02 and generates learning data formed from the first data a01, the context c01, the start symbol ss, and the second data b01.

In addition, the context generation unit 11 may include information representing a relation with the second data b01 in the context. In the example illustrated in FIG. 5, the context generation unit 11 includes a symbol c101 indicating that the word cx is a word to be used in a construction of the second data b01 (output text) in the context c01.

Figure 6:
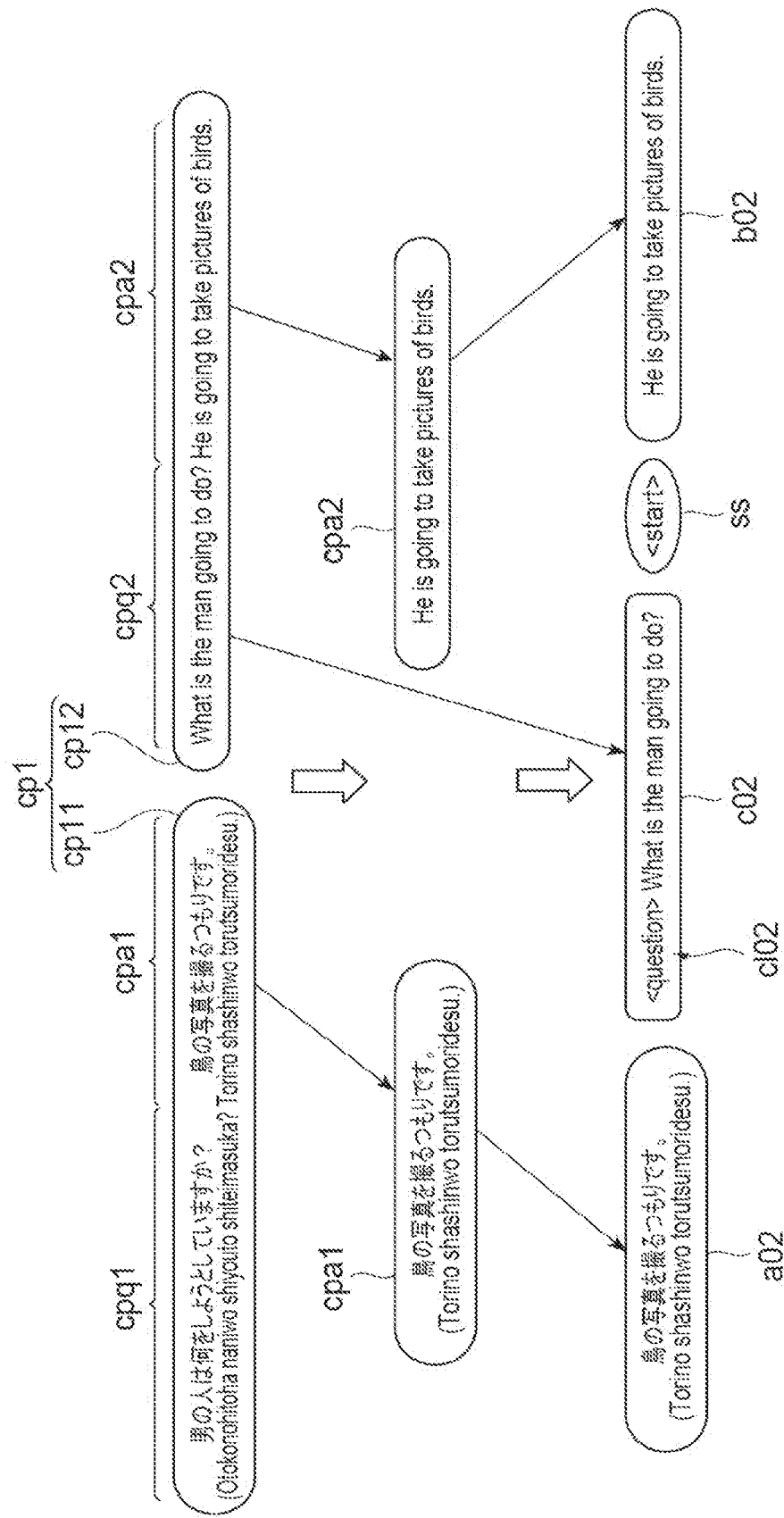
FIG. 6 is a diagram illustrating an example of generation of first data and second data and a context based on a corpus.

FIG. 6 is a diagram illustrating an example of generation of first data and second data and a context based on a corpus. The context generation unit 11, for example, acquires a corpus cp1 from the corpus storage unit 40. The corpus cp1 is formed from a first text cp11 "Otokonohito ha nani wo shiyotoshiteimasuka? Tori no shashin wo torutsumorideus" composed using the first language and a second text cp12 "What is the man going to do? He is going to take pictures of birds." composed using the second language. In the example illustrated in FIG. 6, the first text cp11 is a Japanese text, and the second text cp12 is a text of an English translation of the first text cp11. The first text cp11 is formed from a question sentence cpq1 "Otokonohito ha nani wo shiyotoshiteimasuka?" and an answer sentence cpa1 "Tori no shashin wo torutsumorideus". The second text cp12 is formed from a question sentence cpq2 "What is the man going to do?" and an answer sentence cpa2 "He is going to take pictures of birds.".

The context generation unit 11 extracts an answer sentence formed using the first language and an answer sentence of the second language that is a translation thereof from the corpus as first data and second data. In the example illustrated in FIG. 6, the context generation unit 11 extracts the answer sentence cpa1 of the first language and the answer sentence cpa2 of the second language as the first data a02cpa1 "Tori no shashin wo torutsumorideus" and the second data b02 "He is going to take pictures of birds.".

In addition, on the basis of the corpus including a question sentence and an answer sentence for the question sentence composed using the second language, the context generation unit 11 extracts the question sentence as a context. In the example illustrated in FIG. 6, the context generation unit 11 extracts the question sentence cpq2 from the corpus cp12 formed from the question sentence cpq2 and the answer sentence cpa2 composed using the second language and sets the extracted question sentence cpq2 as a context c02. Then, the context generation unit 11 generates learning data formed from the first data a02, the context c02, the start symbol ss, and the second data b02.

In addition, the context generation unit 11 may include information representing a relation with the second data b02 in the context c02. In the example illustrated in FIG. 6, the context generation unit 11 includes a symbol c102 representing that the context c02 is a question sentence having the second data b02 as an answer sentence in the context c02.

As described with reference to FIGS. 5 and 6, a context can be easily generated on the basis of the corpus, and thus an increase in the cost for obtaining learning data including the context is prevented.

Figure 7:
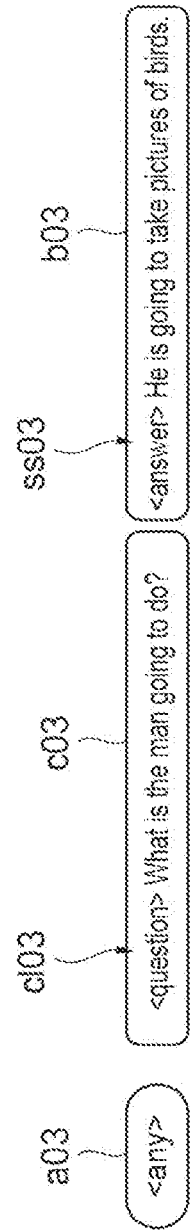
FIG. 7 is a diagram illustrating an example of first data, second data, and a context used for learning a model.

FIG. 7 is a diagram illustrating an example of first data, second data, and a context used for learning a text generation model. Learning data of the text generation model MD may include an arbitrary symbol that is a predetermined symbol having no linguistic semantic as first data in place of an array of a plurality of words composing input text.

As illustrated in FIG. 7, the learning data may be composed using first data formed from an arbitrary symbol a03 having no semantic, a context c03 formed from a question sentence of the second language, and b03 formed from an answer sentence of the second language. On the basis of the corpus formed from a question sentence and an answer sentence of the second language, the context generation unit 11 may generate learning data by extracting the question sentence as a context c03, extracting the answer sentence as second data, and further adding an arbitrary symbol a03.

In addition, the context generation unit 11 includes a symbol c103 representing that the context c03 is a question sentence having the second data b03 as an answer sentence in the context c03. Furthermore, the context generation unit 11 causes the second data b03 to include a start symbol ss03 in the text beginning. The start symbol ss03 may represent start of an answer sentence and represent that the answer sentence is an answer to a question sentence composing the context.

According to the example of the learning data illustrated in FIG. 7, even when first data corresponding to input text that is a translation of output text is not present, the decoder can be caused to learn a relationship between a context and second data. Thus, expansion of learning data can be achieved with a low cost, and accuracy of output text output by the decoder for a desired output can be improved.

The encoder input unit 12 inputs the first data a to the encoder en in accordance with an arrangement order of words.

The decoder input unit 13 inputs a context c, a start symbol ss that is a predetermined symbol indicating start of an output of output text, and second data b to the decoder de in accordance with the arrangement order for each word.

In a later stage after the input of the start symbol ss, the update unit 14 updates weighting coefficients composing the encoder en and the decoder de on the basis of an error for each word between an array of words output from the decoder de and an array of words included in the second data b.

For example, in a case in which the text generation model MD is configured using a recurrent neural network (RNN), the encoder input unit 12 sequentially inputs word vectors of words composing the first data a to an input layer of the RNN configuring the encoder en in a word order. An output of an intermediate layer of the encoder en based on an input of the last word vector of the first data a is output to the decoder de.

Subsequently, the decoder input unit 13 sequentially inputs word vectors of words (including a symbol c1 representing a relation with the second data) composing the context c to an input layer of the RNN configuring the decoder de in a word order. In addition, the decoder input unit 13 sequentially inputs the start symbol ss and the second data b to the decoder de in a word order. When the start symbol ss is input to the decoder de, the decoder de sequentially outputs a series of word vectors of output text t together with likelihoods (for example, using a Softmax function).

The update unit 14 calculates an error between a series of words output from the decoder de and a series of words of the second data b for each word and updates weighting coefficients configuring a neural network of the encoder en and the decoder de, for example, using an error back propagation method.

Figure 8:
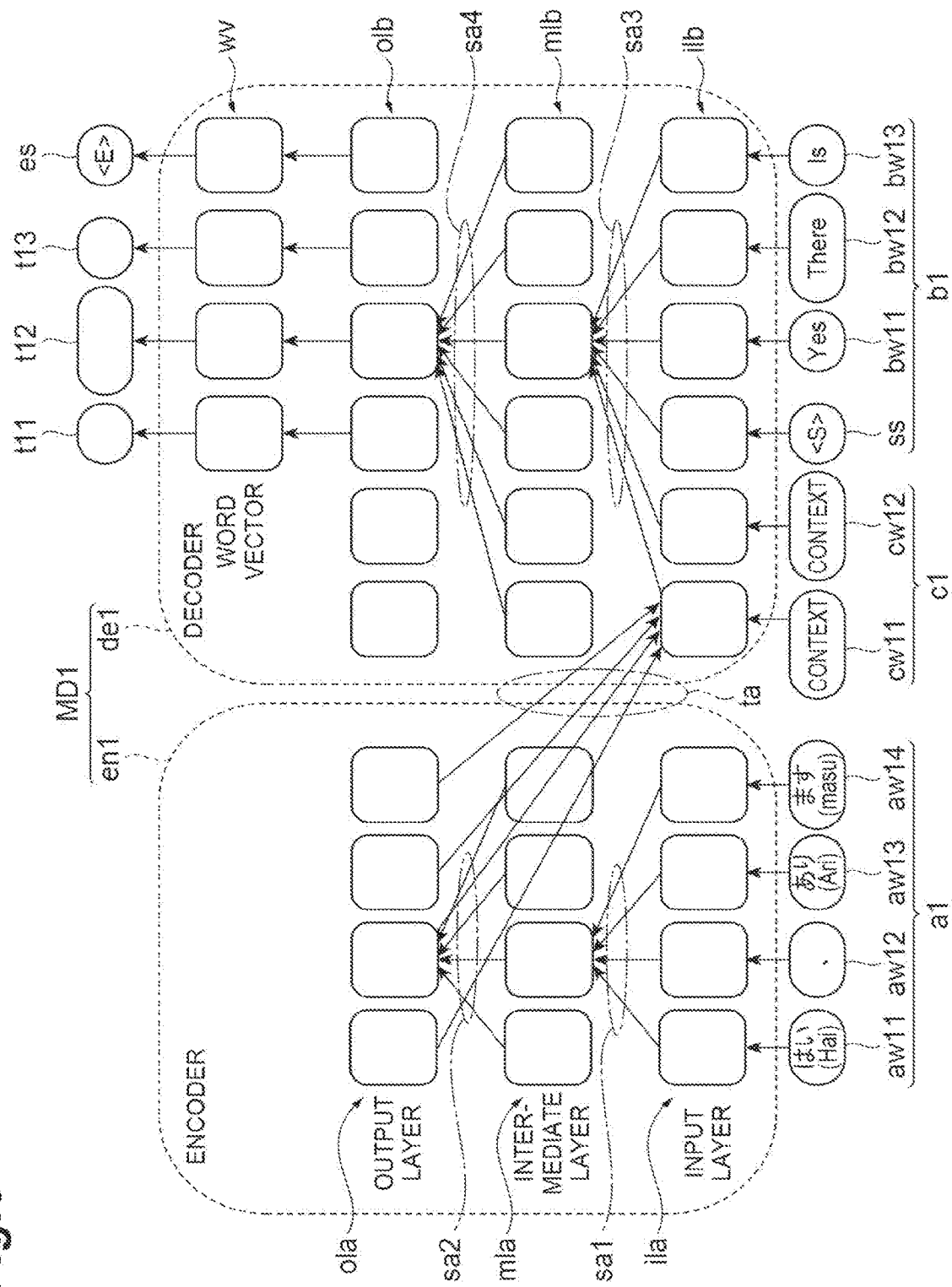
FIG. 8 is a diagram illustrating a schematic configuration of a transformer that is an example of an encoder/decoder model.

FIG. 8 is a diagram illustrating a schematic configuration of a transformer that is an example of an encoder/decoder model. As illustrated in FIG. 8, in a case in which the text generation model MD1 (MD) is configured using a transformer, the encoder input unit 12 inputs word vectors aw11 to aw14 of words composing first data a1 "Hai, Ari masu" to an input layer i1a of the encoder en1 in accordance with an arrangement order of the words. In the transformer, not a sequential input of the words as in the RNN but parallel processing of input data can be performed.

In the encoder en1, a self-attention sa1 from an input layer i1a for an intermediate layer m1a is calculated, and a word vector is converted into a vector according to the self-attention sa1. Similarly, a self-attention sa2 from the intermediate layer m1a for an output layer o1a is calculated, and a word vector is additionally converted. Furthermore, a source target attention ta from the output layer o1a of the encoder en1 for an input layer i1b of the decoder de1 is calculated.

The decoder input unit 13 parallelly inputs word vectors cw11 to cw12 of words composing a context c1, a start symbol ss, and word vectors bw11 to bw13 of words composing second data b1 "Yes There is" to the input layer i1b of the decoder de1 in accordance with an arrangement order of words in a learning phase.

In the decoder de1, similar to the encoder en1, a self-attention sa3 from the input layer i1b to an intermediate layer m1b is calculated, and a vector is converted in accordance with the self-attention sa3. Similarly, a self-attention sa4 from the intermediate layer m1b to an output layer o1b is calculated, and vector conversion according to the self-attention sa4 is performed.

The update unit 14 calculates an error between a word series t11 to t13 based on a word vector wv output in a later stage after an input of a start symbol ss and a word series bw11 to bw13 of words composing second data b1 for each word and updates weighting coefficients used for calculating a self-attention and a source target attention using an error back propagation method.

Referring back to FIG. 1, the model output unit 15 outputs a text generation model MD acquired after machine learning based on learning data of a required amount. The model output unit 15 may store the text generation model MD in the model storage unit 30.

Figure 9:
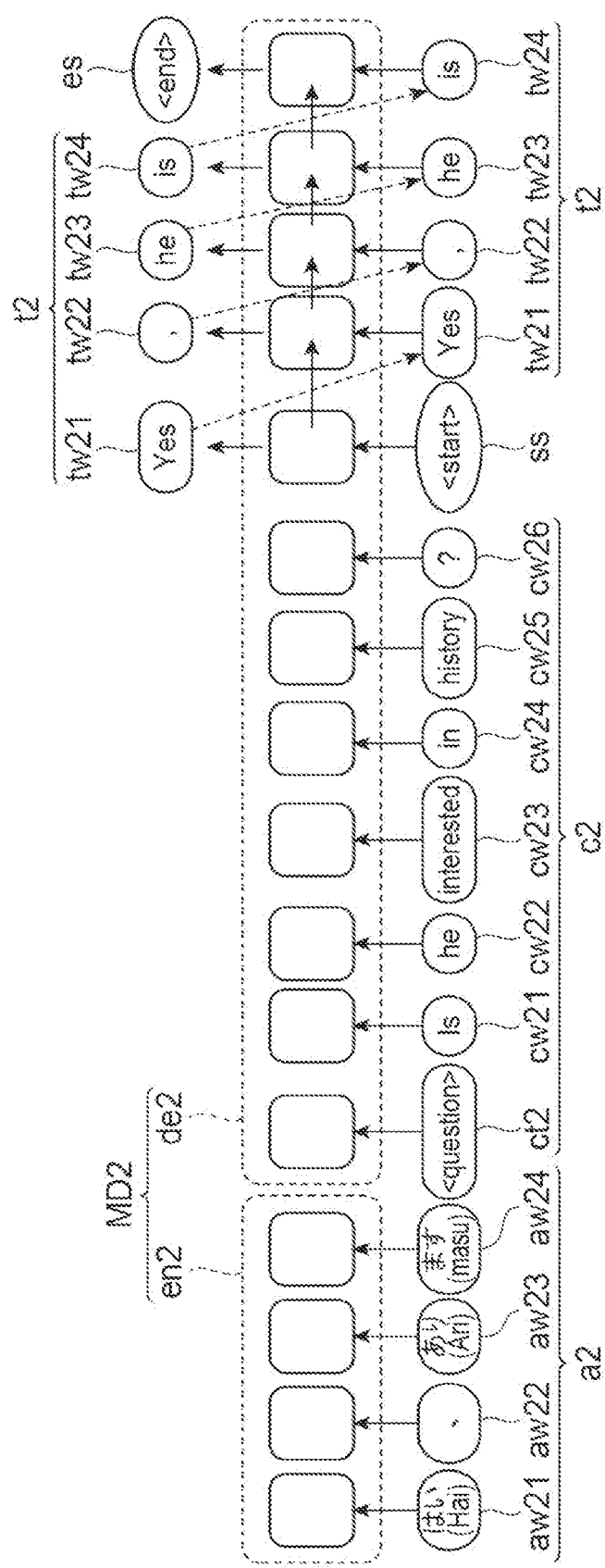
FIG. 9 is a diagram schematically illustrating a text generating process using a text generation model.

Next, processing of a phase of text generation using the functional units of the text generating device 20 and a learned text generation model will be described with reference to FIGS. 2 and 9. FIG. 9 is a diagram schematically illustrating a text generating process using a text generation model.

As illustrated in FIG. 9, a text generation model MD2 is a model that is learned and constructed using the text generation model generating device 10. The text generation model MD2 includes an encoder en2 and a decoder de2.

The text generation model MD (MD1, MD2) that is a model including a learned neural network can be perceived as a program that is read or referred to by a computer, causes the computer to perform a predetermined process, and causes the computer to realize a predetermined function.

In other words, the learned text generation model MD (MD1, MD2) according to this embodiment is used in a computer including a CPU and a memory. More specifically, the CPU of the computer performs an arithmetic operation based on learned weighting coefficients (parameters) corresponding to each layer, a function, and the like for input data input to an input layer of a neural network in accordance with an instruction from the learned text generation model MD (MD1, MD2) stored in a memory and operates to an output result (likelihood) from an output layer.

The input unit 21 inputs words aw21 to aw24 composing input data a2 "Hai, Ari masu" composing input text to the encoder en2 in accordance with an arrangement order. The encoder en2 outputs an arithmetic operation result to the decoder de2.

The context input unit 22 inputs words ct2 and cw21 to cw26 composing an input context c2 formed from one or more words of the second language relating to output text to the decoder de2 in accordance with an arrangement order. The word ct2 is a symbol representing a relation with output text of the context. The input context c2 "Is he interested in history?" is information used for designating a condition of the output text, a context, and the like and, for example, may be a question sentence having words to be included in the output text and the output text as an answer or the like.

The word input unit 23 inputs a start symbol ss to the decoder de2 in a later stage of the input of the input context c2. The decoder de2 outputs a word tw21 of the text beginning of the output text t2 in accordance with the start symbol ss. In each stage after the input of the start symbol ss, the word input unit 23 sequentially inputs words output from the decoder de2 in a prior stage to the decoder de2. In accordance with the words that are sequentially input, the decoder de2 sequentially outputs a series of words tw21 to tw24 composing the output text t2 "Yes, he is".

In a case in which a termination symbol es representing end of an output of the output text is output, the output unit 24 generates output text t2 by arranging the words tw21 to tw24 that are sequentially output in each stage of the decoder de2. Then, the output unit 24 outputs the generated output text t2. Although a form of the output of the output text t2 is not particularly limited, for example, the form may be storage for a predetermined storage means, display for a display means, an output using a voice, or the like.

Figure 10:
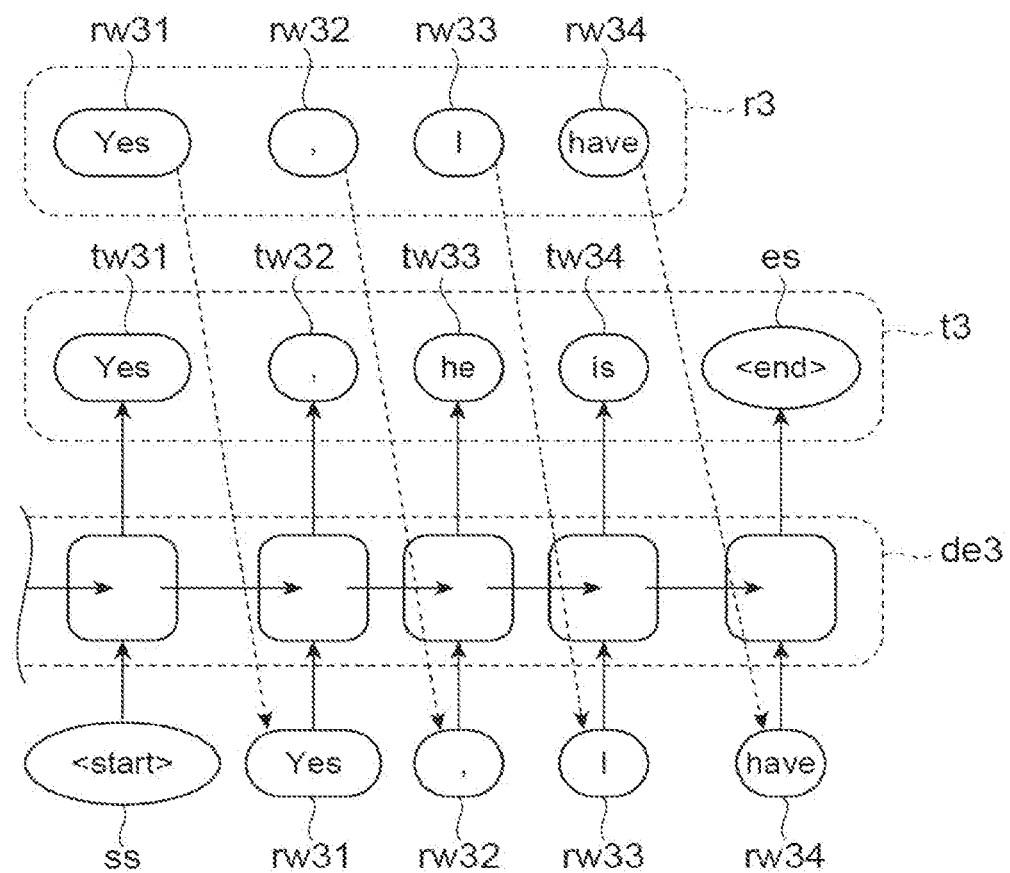
FIG. 10 is a diagram illustrating a process of evaluating generated text in an evaluation system configured using a text generating device.

An evaluation system, which is configured using the text generating device 20, evaluating a generated text will be described with reference to FIG. 10 together with FIG. 2. FIG. 10 is a diagram illustrating a process of evaluating a generated text in an evaluation system configured using the text generating device 20.

A decoder de3 illustrated in FIG. 10 outputs a likelihood representing how likely the word is to be a word composing output text t3 for each word for each of words tw31 to tw34 output in each stage after input of a start symbol ss. The evaluation system configured using the text generating device 20 evaluates a generated text that is generated and input by a user using the output text t3 as a correct answer. For example, a user inputs a translation of input text into the second language as a generated text in accordance with presentation of input text corresponding to the output text t3. In addition, in this embodiment, although a generated text input by a user is assumed to be evaluated, a generated text that is generated and input by a person other than the user, a device, or the like may be configured to be evaluated.

The generated text acquisition unit 25 acquires a generated text r3 that is generated in the second language by a user and is input to the evaluation system. The generated text r3 is formed from an array of words rw31 to rw34.

In each stage after input of a start symbol ss, the generated text input unit 26 sequentially inputs word vectors of the words rw31 to rw34 composing the generated text r3 generated in the second language in place of the words tw31 to tw34 output from the decoder de3 in a prior stage to the decoder de3.

The generated text evaluation unit 27 evaluates the generated text r3 on the basis of a contrast between a likelihood of each of the words rw31 to rw34 output from the decoder de3 in each stage after input of a start symbol ss and a likelihood of each of the words tw31 to tw34 composing the output text t3 on the basis of input of the start symbol ss and sequential inputs of the words rw31 to rw34 composing the generated text r3.

More specifically, in each output stage, the decoder de3 outputs a likelihood of each of words of all the vocabularies handled by the text generation model generating device 10 and text generating device 20. In a phase of a text generating process, by arranging words having the highest likelihood in each output stage, the output text t3 is composed.

In each stage of the decoder de3, the generated text evaluation unit 27 acquires likelihoods associated with the words rw31 to rw34 of the generated text r3 and the termination symbol es from likelihoods of vocabularies output in accordance with input of the start symbol ss and output words (rw31 to rw34) in the prior stage.

By contrasting likelihoods of the words tw31 to tw34 composing the output text t3 with likelihoods of the words rw31 to rw34 of the generated text r3, the generated text evaluation unit 27 calculates and outputs an evaluation value of the generated text r3. A technique for calculating an evaluation value is not limited, and, for example, the calculation may be on the basis of a ratio of likelihoods of words in each of the texts t3 and r3 and a sum, an average, or the like of likelihoods for each of the texts t3 and r3.

According to the evaluation system described with reference to FIG. 10, a generated text is evaluated on the basis of a contrast between a likelihood of each word composing output text and a likelihood of each word acquired by sequentially inputting words composing a generated text, which has been generated and input, to a decoder. In accordance with this, an evaluation system evaluating a likelihood of a generated text as a translation corresponding to input text can be configured.

Figure 11:
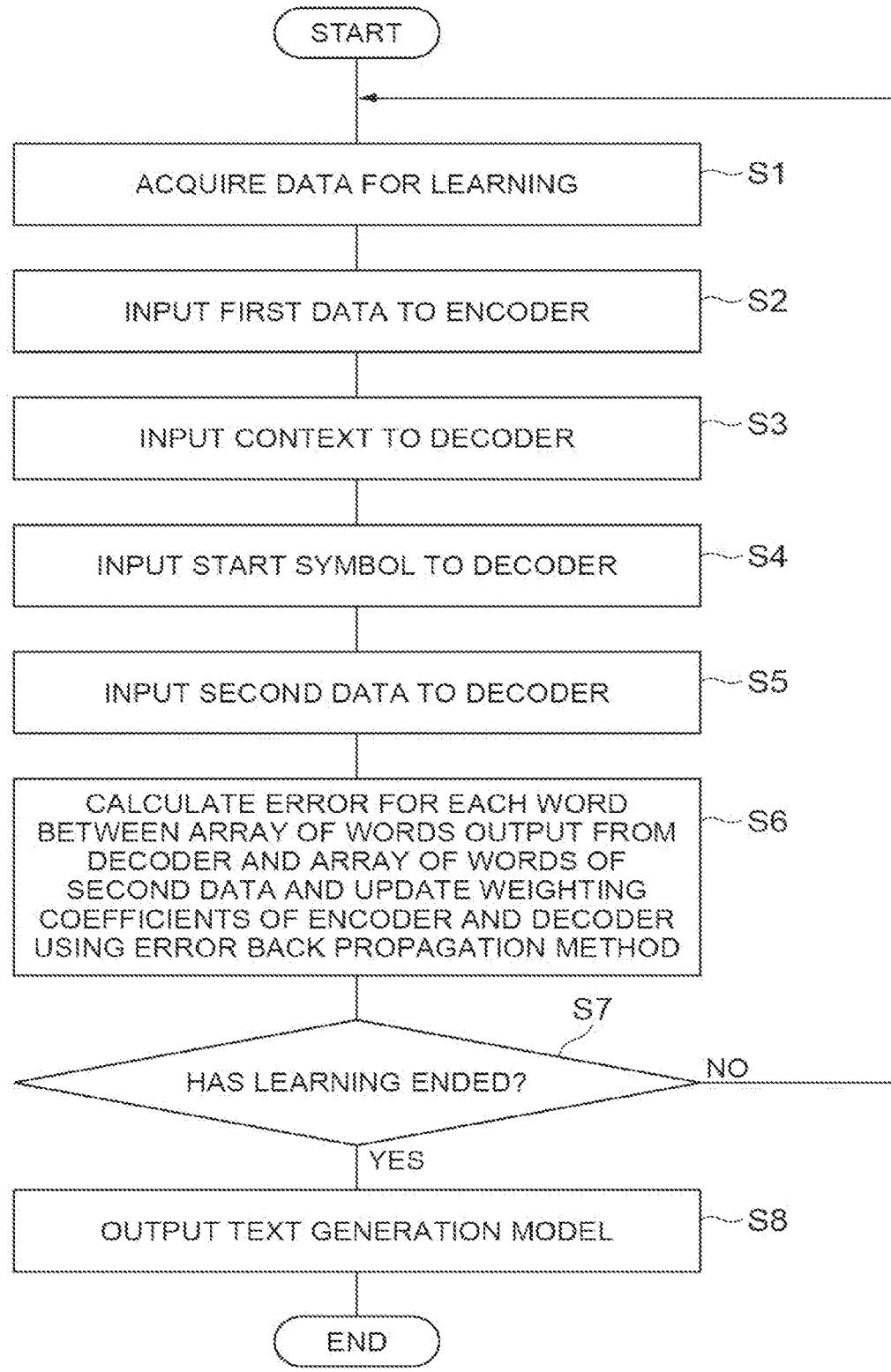
FIG. 11 is a flowchart illustrating processing details of a text generation model generating method in a text generation model generating device.

FIG. 11 is a flowchart illustrating processing details of a text generation model generating method in the text generation model generating device 10.

In Step S1, the text generation model generating device 10 acquires learning data including first data a, second data b, and a context c. The learning data may be data that is generated on the basis of a corpus in advance and is stored in the corpus storage unit 40 or may be data generated on the basis of a corpus by the context generation unit 11.

In Step S2, the first data a is input to the encoder en in accordance with an arrangement order of words.

In Step S3, the decoder input unit 13 inputs the context c to the decoder de. Subsequently, in Step S4, the decoder input unit 13 inputs a start symbol ss to the decoder de. In addition, in Step S5, the decoder input unit 13 inputs the second data b to the decoder de for each word in an arrangement order.

In Step S6, the update unit 14 calculates an error for each word between an array of words output from the decoder de and an array of words included in the second data b in a later stage after input of the start symbol ss and updates weighting coefficients configuring the encoder en and the decoder de using an error back propagation method.

In Step S7, the update unit 14 determines whether or not machine learning based on learning data of a required amount has ended. In a case in which it is determined that learning has ended, the process proceeds to Step S8. On the other hand, in a case in which it is determined that learning has not ended, the processes of Steps S1 to S6 are repeated.

In Step S8, the model output unit 15 outputs the learned text generation model MD.

Figure 12:
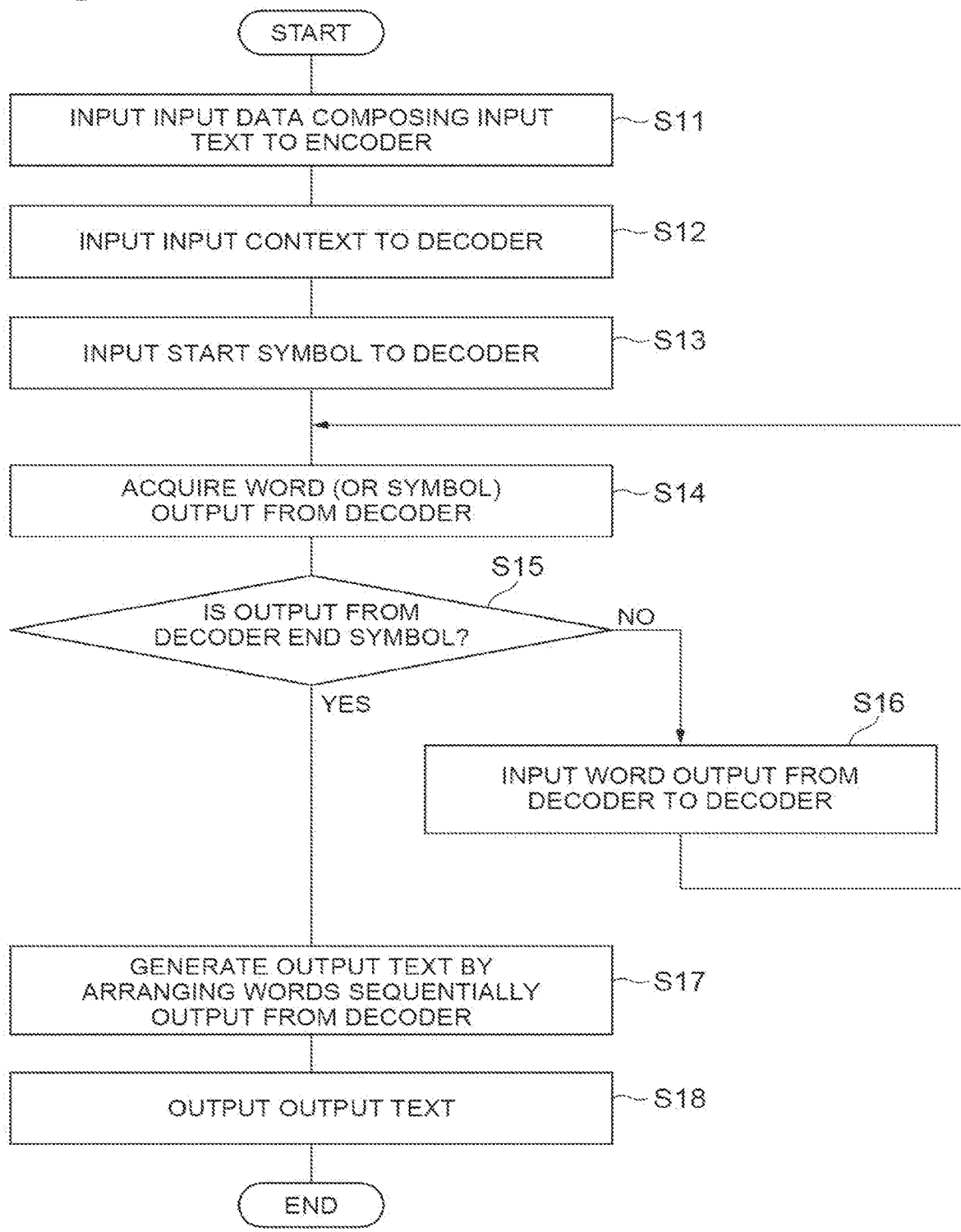
FIG. 12 is a flowchart illustrating processing details of a text generating method in a text generating device.

FIG. 12 is a flowchart illustrating processing details of a text generating method using a learned text generation model MD in the text generating device 20.

In Step S11, the input unit 21 inputs words of input data composing input text to the encoder of the text generation model in accordance with an arrangement order for each word. In accordance with input of the input data, the encoder outputs an arithmetic operation result to the decoder.

In Step S12, the context input unit 22 inputs an input context used for designating conditions for output text to the decoder in accordance with an arrangement order for each word. Subsequently, in Step S13, the word input unit 23 inputs a start symbol ss to the decoder in a later stage of the input of the input context.

In Step S14, the output unit 24 acquires a word (or a symbol) output from the output layer of the decoder. In Step S15, the output unit 24 determines whether or not the output from the decoder is a termination symbol indicating end of the output of the output text. In a case in which it is determined that the output from the decoder is the termination symbol, the process proceeds to Step S17. On the other hand, in a case in which it is determined that the output from the decoder is not the termination symbol, the process proceeds to Step S16.

In Step S16, the word input unit 23 inputs a word output from an output layer of a prior stage of the decoder to an input layer of the current stage of the decoder. Then, the process returns to Step S14.

In Step S17, the output unit 24 generates output text by arranging words sequentially output from an output layer in each stage of the decoder. Then, in Step S18, the output unit 24 outputs the output text.

Next, a text generation model generating program for causing a computer to function as the text generation model generating device 10 according to this embodiment will be described with reference to FIG. 13.

Figure 13:
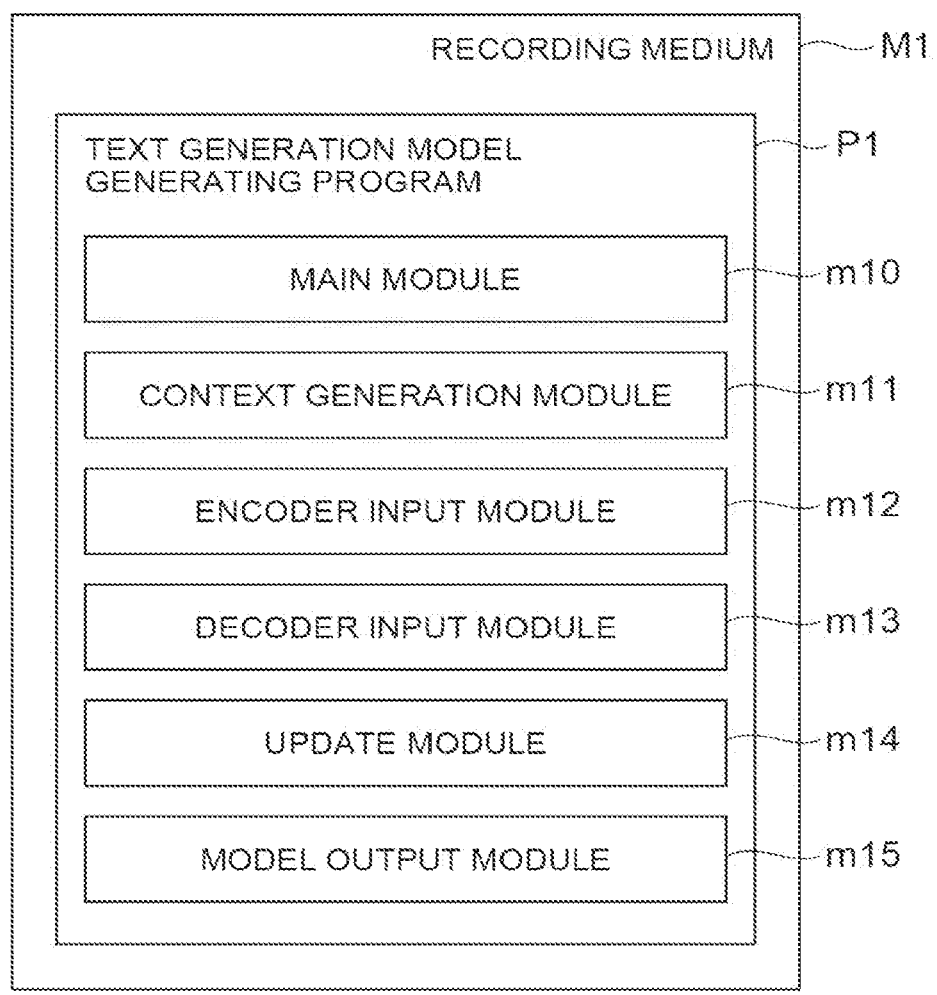
FIG. 13 is a diagram illustrating a configuration of a text generation model generating program.

FIG. 13 is a diagram illustrating a configuration of the text generation model generating program. The text generation model generating program P1 is configured to include a main module m10 that integrally controls a text generation model generating process in the text generation model generating device 10, a context generation module m11, an encoder input module m12, a decoder input module m13, an update module m14, and a model output module m15. By using the modules m11 to m15, functions for the context generation unit 11, the encoder input unit 12, the decoder input unit 13, the update unit 14, and the model output unit 15 are realized.

In addition, the text generation model generating program P1 may be in a form of being transmitted through a transmission medium such as a communication line or the like and, as illustrated in FIG. 13, may be in a form of being stored in a recording medium M1.

Next, a text generating program used for causing a computer to function as the text generating device 20 according to this embodiment will be described with reference to FIG. 14.

Figure 14:
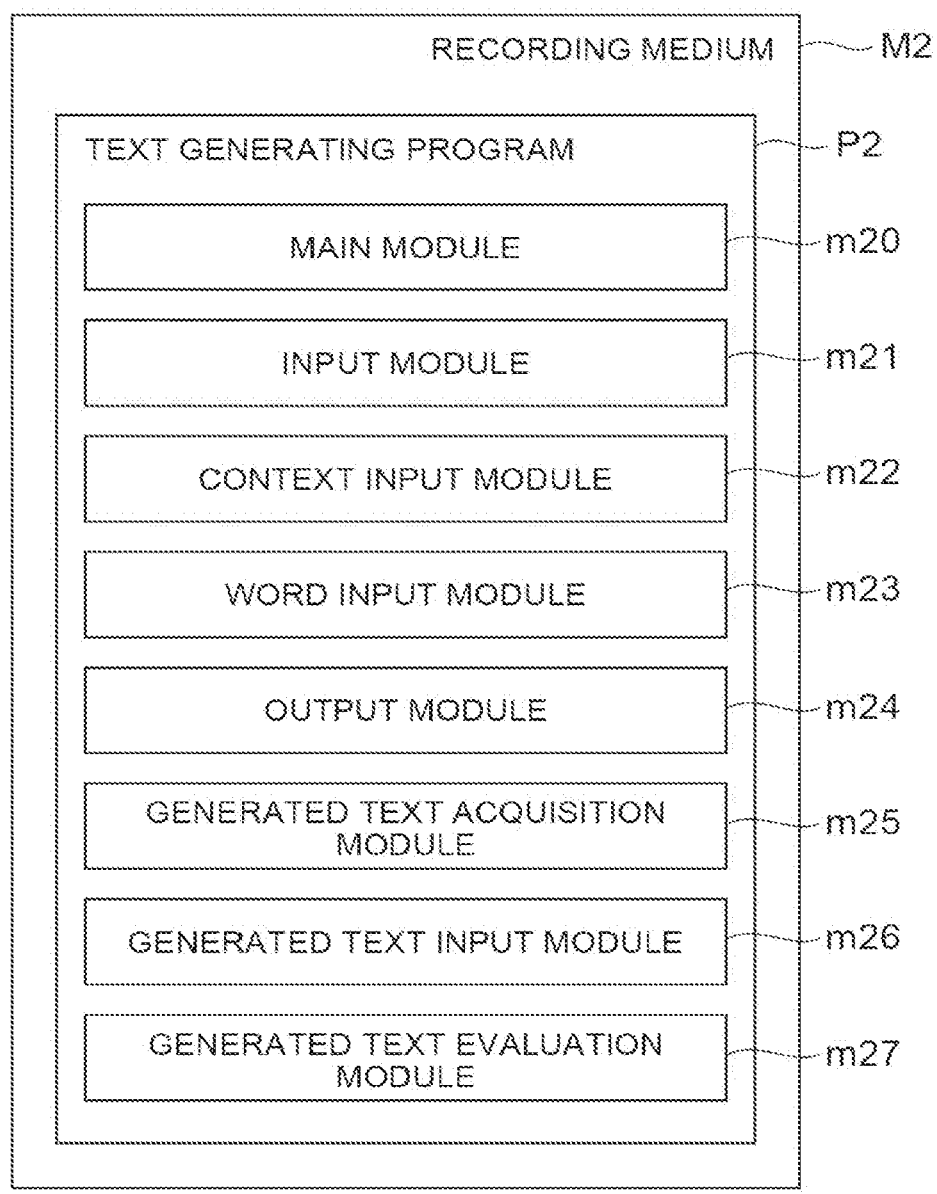
FIG. 14 is a diagram illustrating a configuration of a text generating program.

FIG. 14 is a diagram illustrating a configuration of a text generating program. The text generating program P2 is configured to include a main module m20 that integrally controls a text generating process in the text generating device 20, an input module m21, a context input module m22, a word input module m23, and an output module m24. In addition, the text generating program P2 may further include a generated text acquisition module m25, a generated text input module m26, and a generated text evaluation module m27. By using the modules m21 to m27, functions for the input unit 21, the context input unit 22, the word input unit 23, the output unit 24, the generated text acquisition unit 25, the generated text input unit 26, and the generated text evaluation unit 27 are realized.

In addition, the text generating program P2 may be in a form of being transmitted through a transmission medium such as a communication line or the like and, as illustrated in FIG. 14, may be in a form of being stored in a recording medium M2.

According to the text generation model generating device 10, the text generation model generating method, and the text generation model generating program P1 of this embodiment described above, the text generation model is configured using an encoder decoder model that includes an encoder and a decoder. In learning of a text generation model in which first data corresponding to input text is input to an encoder, and second data corresponding to output text is input to a decoder, a context including words relating to the second data, that is, the output text is input to the decoder together with the second data. Thus, the text generation model learns a relationship between the context and the second data, and thus the text generation model in which output text according to conditions of output text set in the context is output can be acquired.

In addition, in a text generation model generating device according to another embodiment, a context may include one or more words composing a part of the second data.

According to the embodiment described above, words to be used in output text are included in the context, and thus, the text generation model capable of outputting output text including words to be used can be generated.

In addition, a text generation model generating device according to another embodiment may further include a context generation unit configured to extract words composing a part of a second text as the context on the basis of a corpus formed from a first text composed using the first language and the second text, which is a translation of the first text, composed using the second language.

According to the embodiment described above, on the basis of the corpus, a context used for designating words to be used in output text as a condition can be acquired as learning data.

In addition, in a text model generating device according to another embodiment, the context may be a question sentence of the second language having the output text composed of words included in the second data as an answer sentence.

According to the embodiment described above, a question sentence having output text as an answer sentence is included in the context, and thus, the text generation model capable of outputting an answer sentence following a question sentence as a context as output text can be generated.

In addition, a text model generating device according to another embodiment may further include a context generation unit configured to extract a question sentence as the context on the basis of a corpus including the question sentence and an answer sentence for the question sentence composed using the second language.

According to the embodiment described above, on the basis of the corpus, a context for designating a context to be followed in the output text as a condition can be acquired as learning data.

In addition, in a text model generating device according to another embodiment, the first data may be an arbitrary symbol that is a predetermined symbol having no linguistic semantic in place of the array of the plurality of words composing the input text.

According to the embodiment described above, even when first data corresponding to input text that is a translation of output text is not present, a relationship between the context and the second data can be learned by the decoder. Thus, expansion of learning data can be achieved with a low cost, and accuracy of output text output by the decoder for a desired output can be improved.

In addition, in a text model generating device according to another embodiment, the context may include information representing a relation with the second data.

According to the embodiment described above, a method of using a condition designated in the context can be learned by the decoder. Thus, accuracy of output text output by the decoder for a desired output can be improved.

In order to solve the problems described above, a text generation model according to an embodiment of the present invention is a text generation model that has learned by machine learning for generating output text of a second language different from a first language in accordance with input of input text of the first language by causing a computer to function, in which learning data used for the machine learning of the text generation model includes first data including an array of a plurality of words composing the input text, second data including an array of a plurality of words composing the output text corresponding to the input text, and a context including one or more words of the second language relating to the second data, and the text generation model is an encoder decoder model that includes a neural network and is configured using an encoder and a decoder and is constructed by machine learning in which: the first data is input to the encoder in accordance with an arrangement order of words; the context, a start symbol that is a predetermined symbol indicating start of output of the output text, and the second data are input to the decoder in accordance with an arrangement order of words and symbols in the context, the start symbol, and the second data; and weighting coefficients configuring the encoder and the decoder are updated on the basis of an error for each word between an array of words output from the decoder in a later stage after input of the start symbol and an array of words included in the second data.

According to the embodiment described above, the text generation model is configured using an encoder decoder model including an encoder and a decoder. In learning of the text generation model, first data corresponding to input text is input to the encoder, second data corresponding to output text is input to the decoder, and a context including words relating to the second data, that is, the output text is input to the decoder together with the second data. Thus, since a relationship between the context and the second data is learned, the text generation model can output text according to a condition of the output text set in the context.

In order to solve the problem described above, a text generating device according to one embodiment of the present invention is text generating device generating output text of a second language different from a first language in accordance with input of input text of the first language using a text generation model constructed by machine learning, in which learning data used for the machine learning of the text generation model includes first data including an array of a plurality of words corresponding to the input text, second data including an array of a plurality of words corresponding to the output text corresponding to the input text, and a context including one or more words of the second language relating to the second data, and the text generation model is an encoder decoder model that includes a neural network and is configured using an encoder and a decoder and is constructed by machine learning in which: the first data is input to the encoder in accordance with an arrangement order of words; the context, a start symbol that is a predetermined symbol indicating start of output of the output text, and the second data are input to the decoder in accordance with an arrangement order of words and symbols in the context, the start symbol, and the second data; and weighting coefficients configuring the encoder and the decoder are updated on the basis of an error for each word between an array of words output from the decoder in a later stage after input of the start symbol and an array of words included in the second data, the text generating device including: an input unit configured to input data configuring the input text to the encoder in accordance with an arrangement order of words; a context input unit configured to input an input context formed from one or more words of the second language relating to the output text to the decoder; a word input unit configured to input the start symbol to the decoder in a later stage of the input of the input context and sequentially input words output from the decoder of a prior stage to the decoder in each stage after the input of the start symbol; and an output unit configured to generate the output text by arranging the words sequentially output in each stage of the decoder and output the generated output text.

According to the embodiment described above, the text generation model is configured using an encoder decoder model including an encoder and a decoder. In learning of the text generation model, first data corresponding to input text is input to the encoder, second data corresponding to output text is input to the decoder, and a context including words relating to the second data, that is, the output text is input to the decoder together with the second data. In accordance with this, the text generation model that has learned learns a relationship between the context and the second data. Thus, by inputting input data composing the input text to the encoder and inputting an input context for designating conditions for the output text to the decoder, output text according to a desired condition can be output.

In addition, in a text generating device according to another embodiment, for each of words output in each stage after the input of the start symbol, the decoder outputs a likelihood representing how likely the word to be a word composing the output text for each of the words, the text generating device further including: a generated text input unit configured to sequentially input words composing a generated text generated using the second language to the decoder in place of words output from the decoder in a prior stage in each stage after the input of the start symbol; and a generated text evaluation unit configured to evaluate the generated text on the basis of a contrast between a likelihood of each of words composing the generated text output from the decoder in each stage after input of the start symbol on the basis of the input of the start symbol and sequential input of each of the words composing the generated text and a likelihood of each of the words composing the output text.

According to the embodiment described above, a generated text is evaluated on the basis of a contrast between a likelihood of each of words composing the output text and a likelihood of each of the words acquired by sequentially inputting words composing a generated text that has been generated and input to the decoder. In accordance with this, an evaluation system evaluating a likelihood of a generated text as a translation corresponding to input text can be configured.

As above, while the present embodiment has been described in detail, it is apparent to a person skilled in the art that the present invention is not limited to the embodiments described in this specification. The embodiment may be modified or changed without departing from the concept and the scope of the present invention set in accordance with the claims. Thus, the description presented in this specification is for the purpose of exemplary description and does not have any limited meaning for the embodiment.

Each aspect/embodiment described in the present specification may be applied to long term evolution (LTE), LTE-advanced (LTE-A), Super 3G, IMT-advanced, 4G, 5G, future ratio access (FRA), W-CDMA (Registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), a system using another appropriate system and/or a next generation system extended based on these.

The processing sequence, the sequence, the flowchart, and the like of each aspect/embodiment described in the present specification may be changed in order as long as there is no contradiction. For example, in a method described in the present specification, elements of various steps are presented in an exemplary order, and the method is not limited to the presented specific order.

The input/output information and the like may be stored in a specific place (for example, a memory) or managed using a management table. The input/output information and the like may be overwritten, updated, or additionally written. The output information and the like may be deleted. The input information and the like may be transmitted to another device.

A judgment may be performed using a value ("0" or "1") represented by one bit, may be performed using a Boolean value (true or false), or may be performed using a comparison between numerical values (for example, a comparison with a predetermined value).

The aspects/embodiments described in the present specification may be individually used, used in combination, or be switched therebetween in accordance with execution. In addition, a notification of predetermined information (for example, a notification of being X) is not limited to be performed explicitly and may be performed implicitly (for example, a notification of the predetermined information is not performed).

As above, while the present disclosure has been described in detail, it is apparent to a person skilled in the art that the present disclosure is not limited to the embodiments described in the present disclosure. The present disclosure may be modified or changed without departing from the concept and the scope of the present disclosure set in accordance with the claims. Thus, the description presented in the present disclosure is for the purpose of exemplary description and does not have any limited meaning for the present disclosure.

It is apparent that software, regardless whether it is called software, firmware, middleware, a microcode, a hardware description language, or any other name, be widely interpreted to mean a command, a command set, a code, a code segment, a program code, a program, a subprogram, a software module, an application, a software application, a software package, a routine, a subroutine, an object, an executable file, an execution thread, an order, a function, and the like.

In addition, software, a command, and the like may be transmitted and received via a transmission medium. For example, in a case in which software is transmitted from a website, a server, or any other remote source using wiring technologies such as a coaxial cable, an optical fiber cable, a twisted pair, a digital subscriber line (DSL) and the like and/or radio technologies such infrared rays, radio waves, and microwaves, and the like, such wiring technologies and/or radio technologies are included in the definition of the transmission medium.

Information, a signal, and the like described in the present disclosure may be represented using any one among other various technologies. For example, data, an instruction, a command, information, a signal, a bit, a symbol, a chip, and the like described over the entire description presented above may be represented using a voltage, a current, radio-waves, a magnetic field or magnetic particles, an optical field or photons, or an arbitrary combination thereof.

In addition, a term described in the present disclosure and/or a term that is necessary for understanding the present specification may be substituted with terms having the same meaning or a meaning similar thereto.

Terms "system" and "network" used in the present specification are compatibly used.

In addition, information, a parameter, and the like described in the present specification may be represented using absolute values, relative values from predetermined values, or other corresponding information.

Terms such as "determining" used in the present disclosure may include various operations of various types. The "deciding" and "determining", for example, may include a case in which judging, calculating, computing, processing, deriving, investigating, looking up, search, and inquiry (for example, looking up a table, a database, or any other data structure), or ascertaining is regarded as "deciding" and "determining". In addition, "deciding" and "determining" may include a case in which receiving (for example, receiving information), transmitting (for example, transmitting information), input, output, or accessing (for example, accessing data in a memory) is regarded as "deciding" and "determining". Furthermore, "deciding" and "determining" may include a case in which resolving, selecting, choosing, establishing, comparing, or the like is regarded as "deciding" and "determining". In other words, "deciding" and "determining" includes a case in which a certain operation is regarded as "deciding" and "determining". In addition, "deciding (determining)" may be replaced with "assuming", "expecting", "considering", and the like.

Description of "on the basis of" used in the present disclosure does not mean "only on the basis of" unless otherwise mentioned. In other words, description of "on the basis of" means both "only on the basis of" and "on the basis of at least."

In the present specification, in a case in which names such as "first," "second," and the like is used, referring to each element does not generally limit the amount or the order of such an element. Such names may be used in the present specification as a convenient way for distinguishing two or more elements from each other. Accordingly, referring to the first and second elements does not mean that only the two elements are employed therein or the first element precedes the second element in a certain form.

As long as "include," "including," and modifications thereof are used in the present specification or the claims, such terms are intended to be inclusive like a term "comprising." In addition, a term "or" used in the present specification or the claims is intended to be not an exclusive logical sum.

In the present specification, other than a case in which clearly only one device is present in a context or technically, a device includes a plurality of devices.

In the entirety of the present disclosure, unless a singular form is represented clearly from the context, plural forms are included.

REFERENCE SIGNS LIST

10 Text generation model generating device
11 Context generation unit
12 Encoder input unit
13 Decoder input unit
14 Update unit
15 Model output unit
20 Text generating device
21 Input unit
22 Context input unit
23 Word input unit
24 Output unit
25 Generated text acquisition unit
26 Generated text input unit
27 Generated text evaluation unit
30 Model storage unit
40 Corpus storage unit
de, de1, de2, de3 Decoder
en, en1, en2 Encoder M1 Recording medium
m10 Main module
m11 Context generation model
m12 Encoder input module
m13 Decoder input module
m14 Update module
m15 Model output module
M2 Recording medium
m20 Main module
m21 Input module
m22 Context input module
m23 Word input module
m24 Output module
m25 Generated text acquisition module
m26 Generated text input module
m27 Generated text evaluation module
MD, MD1, MD2 Text generation module
P1 Text generation model generating program
P2 Text generating program

The invention claimed is:

1. A text generation model generating device generating a text generation model generating output text of a second language different from a first language in accordance with input of input text of the first language by machine learning,
wherein the text generation model is an encoder decoder model that includes a neural network and is configured using an encoder and a decoder,
wherein learning data used for the machine learning of the text generation model includes first data, a context, and second data,
the first data including an array of a plurality of words composing the input text,
the second data including an array of a plurality of words composing the output text corresponding to the input text, and
the context including one or more words of the second language relating to the second data,
the text generation model generating device comprises circuitry configured to:
input the first data to the encoder in accordance with an arrangement order of words;
input the context, a start symbol that is a predetermined symbol indicating start of output of the output text, and words composing the second data to the decoder in accordance with an arrangement order;
update weighting coefficients configuring the encoder and the decoder on the basis of an error for each word between an array of words output from the decoder in a later stage after input of the start symbol and an array of words included in the second data; and
output the text generation model in which the weighting coefficients are updated by the circuitry.

2. The text generation model generating device according to claim 1, wherein the context includes one or more words composing a part of the second data.

3. The text generation model generating device according to claim 2, wherein the circuitry is further configured to extract words composing a part of second text as the context on the basis of a corpus formed from first text composed using the first language and the second text, which is a translation of the first text, composed using the second language.

4. The text generation model generating device according to claim 3, wherein the first data is an arbitrary symbol that is a predetermined symbol having no linguistic semantic in place of the array of the plurality of words composing the input text.

5. The text generation model generating device according to claim 2, wherein the first data is an arbitrary symbol that is a predetermined symbol having no linguistic semantic in place of the array of the plurality of words composing the input text.

6. The text generation model generating device according to claim 1, wherein the context is a question sentence of the second language having the output text composed of words included in the second data as an answer sentence.

7. The text generation model generating device according to claim 6, wherein the circuitry is further configured to extract a question sentence as the context on the basis of a corpus including the question sentence and an answer sentence for the question sentence composed using the second language.

8. The text generation model generating device according to claim 7, wherein the first data is an arbitrary symbol that is a predetermined symbol having no linguistic semantic in place of the array of the plurality of words composing the input text.

9. The text generation model generating device according to claim 6, wherein the first data is an arbitrary symbol that is a predetermined symbol having no linguistic semantic in place of the array of the plurality of words composing the input text.

10. The text generation model generating device according to claim 1, wherein the first data is an arbitrary symbol that is a predetermined symbol having no linguistic semantic in place of the array of the plurality of words composing the input text.

11. The text generation model generating device according to claim 1, wherein the context includes information representing a relation with the second data.

12. A text generating device generating output text of a second language different from a first language in accordance with input of input text of the first language using a text generation model constructed by machine learning,
wherein learning data used for the machine learning of the text generation model includes first data including an array of a plurality of words corresponding to the input text, second data including an array of a plurality of words corresponding to the output text corresponding to the input text, and a context including one or more words of the second language relating to the second data, and
wherein the text generation model is an encoder decoder model that includes a neural network and is configured using an encoder and a decoder and is constructed by machine learning in which:
the first data is input to the encoder in accordance with an arrangement order of words;
the context, a start symbol that is a predetermined symbol indicating start of output of the output text, and the second data are input to the decoder in accordance with an arrangement order of words and symbols in the context, the start symbol, and the second data; and
weighting coefficients configuring the encoder and the decoder are updated on the basis of an error for each word between an array of words output from the decoder in a later stage after input of the start symbol and an array of words included in the second data,
the text generating device comprises circuitry configured to:
input data configuring the input text to the encoder in accordance with an arrangement order of words;

input an input context formed from one or more words of the second language relating to the output text to the decoder;

input the start symbol to the decoder in a later stage of the input of the input context and sequentially input words output from the decoder of a prior stage to the decoder in each stage after the input of the start symbol; and generate the output text by arranging the words sequentially output in each stage of the decoder and output the generated output text.

13. The text generating device according to claim 12, wherein, for each word output in each stage after the input of the start symbol, the decoder outputs a likelihood representing how likely the word is to be a word composing the output text, wherein the circuitry is further configured to:

sequentially input words composing generated text generated using the second language to the decoder in place of words output from the decoder in a prior stage in each stage after the input of the start symbol; and evaluate the generated text on the basis of a contrast between a likelihood of each word composing the generated text output from the decoder in each stage after input of the start symbol on the basis of the input of the start symbol and sequential input of each of the words composing the generated text and a likelihood of each of the words composing the output text.

\* \* \* \* \*